(12) United States Patent
Hsiao

(10) Patent No.: US 8,159,631 B2
(45) Date of Patent: Apr. 17, 2012

(54) BACKLIGHT MODULE AND LIQUID CRYSTAL DISPLAY WITH THE SAME

(75) Inventor: Chih-Chung Hsiao, Miao-Li (TW)

(73) Assignee: Chimei Innolux Corporation, Miaoli County (TW)

( * ) Notice: Subject to any disclaimer, the term of this patent is extended or adjusted under 35 U.S.C. 154(b) by 1144 days.

(21) Appl. No.: 12/005,844

(22) Filed: Dec. 28, 2007

(65) Prior Publication Data

US 2008/0158477 A1 Jul. 3, 2008

(30) Foreign Application Priority Data

Dec. 29, 2006 (TW) .............................. 95223099 U

(51) Int. Cl.
*G02F 1/1335* (2006.01)
*F21V 7/04* (2006.01)

(52) U.S. Cl. ............ 349/61; 349/65; 362/600; 362/607; 362/609; 362/97.1

(58) Field of Classification Search ............ 349/65, 349/67, 61; 362/600, 606–609, 612, 615, 362/621–624, 97.1–97.4

See application file for complete search history.

(56) References Cited

U.S. PATENT DOCUMENTS

| 7,344,291 | B2 * | 3/2008 | Hatanaka et al. | 362/610 |
|---|---|---|---|---|
| 7,448,785 | B2 * | 11/2008 | Suzuki | 362/612 |
| 7,637,646 | B2 * | 12/2009 | Byun et al. | 362/608 |
| 2006/0164858 | A1 | 7/2006 | Park et al. | |
| 2006/0291250 | A1 * | 12/2006 | Yang et al. | 362/615 |
| 2007/0064417 | A1 * | 3/2007 | Hatanaka et al. | 362/231 |

FOREIGN PATENT DOCUMENTS

WO    WO 2005057083 A1 *    6/2005

* cited by examiner

*Primary Examiner* — Brian M. Healy
*Assistant Examiner* — Mary El Shammaa
(74) *Attorney, Agent, or Firm* — WPAT., P.C.; Justin King

(57) ABSTRACT

An exemplary backlight module (1) includes a light guide plate (122), a first light source (125) and a second light source (126). The first light source includes first light emitting diodes (1252) and first reflective members (1253). The second light source includes second light emitting diodes (1262) and second reflective members (1263). The light guide plate includes a first light incident surface (1220) and a second light incident surface (1221) opposite to the first light incident surface. The first light source and the second light source are provided adjacent to the first light incident surface and the second light incident surface, respectively. The first light emitting diodes face the second reflective members, and the second light emitting diodes face the first reflective members.

17 Claims, 4 Drawing Sheets

BACKLIGHT MODULE AND LIQUID CRYSTAL DISPLAY WITH THE SAME

CROSS-REFERENCE TO RELATED APPLICATION

This application is related to, and claims the benefit of, a foreign priority application filed in Taiwan as Application No. 95223099 on Dec. 29, 2006. The related application is incorporated herein by reference.

FIELD OF THE INVENTION

The present invention relates to backlight modules used in liquid crystal displays, and particularly relates to a backlight module having a plurality of light emitting diodes (LEDs) and a plurality of reflective elements disposed between the LEDs and a liquid crystal display using the backlight module.

GENERAL BACKGROUND

Liquid crystal displays are commonly used as display devices for compact electronic apparatuses, because they not only provide good quality images but are also very thin. Because liquid crystal molecules in a liquid crystal display do not emit any light themselves, the liquid crystal molecules have to be lit by a light source so as to clearly and sharply display text and images. Therefore, liquid crystal displays usually require a backlight module.

Referring to FIG. 5, a typical backlight module 5 includes a reflective film 51, a light guide plate 52, a diffusion film 53 and a brightness enhancement film (BEF) 54 arranged in that order from bottom to top, and a light source 55. The light guide plate 52 includes a light incident surface 521, a light emitting surface 522 perpendicularly adjoining the light incident surface 521 and a bottom surface 523 opposite to the light emitting surface 522. The light source 55 is disposed adjacent to the light incident surface 521 of the light guide plate 52. The reflective film 51 is disposed below the bottom surface 523 of the light guide plate 52. The light source 55 includes a supporting plate 550 and a plurality of LEDs 551 disposed on the supporting plate 550.

In operation, light beams from the LEDs 551 enter the light guide plate 52 through the light incident surface 521, and penetrate in the light guide plate 52. A majority of the light beams emit out from the light emitting surface 522. A minority of the light beams emit out from the bottom surface 523 and reach the reflective film 51. These light beams are reflected by the reflective film 51 and are utilized again. These light beams enter the light guide plate 52 again through the bottom surface 523, and emit out from the light emitting surface 522. Then, light beams transmit through the diffusion film 53 and the BEF 54 and become uniform.

However, each of the LEDs 551 has a certain limited angle of divergence of light beams emitted therefrom. Therefore areas adjacent to the light incident surface 521 of the light guide plate 52 beyond the angles of divergence of the LEDs 551 may be relatively dark. That is, light beams emitted from the backlight module 5 may be non-uniform, and the performance of an associated LCD may be impaired.

What is needed, therefore, is a backlight module that can overcome the above-described deficiencies. What is also need is a liquid crystal display having such backlight module.

SUMMARY

In one preferred embodiment, a backlight module includes a light guide plate, a first light source and a second light source. The first light source includes a plurality of first light emitting diodes and a plurality of first reflective members. The second light source includes a plurality of second light emitting diodes and a plurality of second reflective members. The light guide plate includes a first light incident surface and a second light incident surface opposite to the first light incident surface. The first light source and the second light source are provided adjacent to the first light incident surface and the second light incident surface, respectively. The first light emitting diodes face the second reflective members, and the second light emitting diodes face the first reflective members.

Other novel features, advantages and aspects will become more apparent from the following detailed description when taken in conjunction with the accompanying drawings.

DETAILED DESCRIPTION OF PREFERRED EMBODIMENTS

Reference will now be made to the drawings to describe the preferred embodiments in detail.

Figure 1:
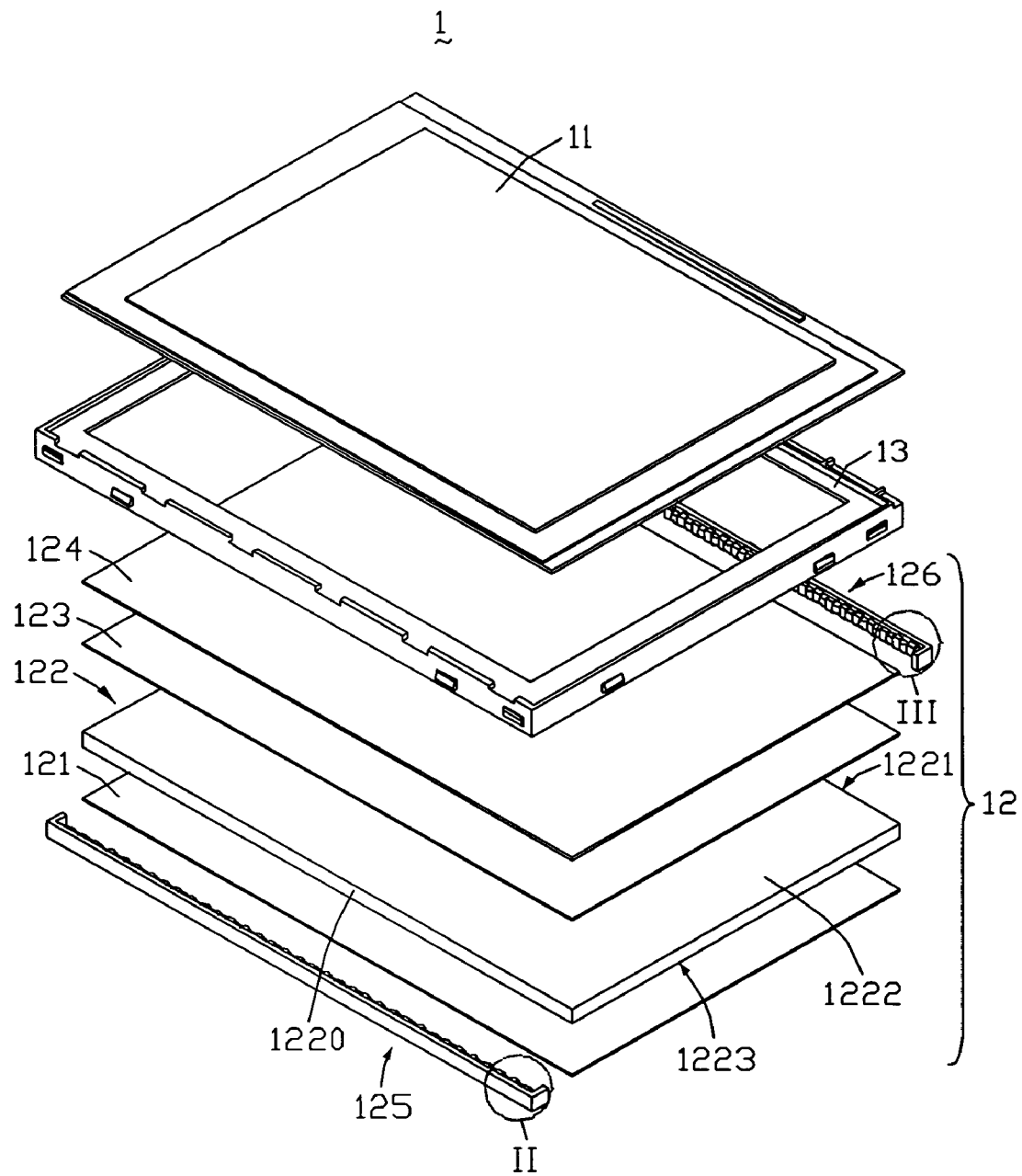
FIG. 1 is an exploded, isometric view of a liquid crystal display according to a preferred embodiment of the present invention, the liquid crystal display including a first light source, a second light source and a light guide plate.

Referring to FIG. 1, a liquid crystal display 1 according to a preferred embodiment of the present invention is shown. The liquid crystal display 1 includes a liquid crystal panel 11, a backlight module 12 adjacent to the liquid crystal panel 11 and a plastic frame 13. The plastic frame 13 defines a space to accommodate the liquid crystal panel 11 and the backlight module 12.

The backlight module 12 includes a reflective film 121, a light guide plate 122, a diffusion film 123 and a brightness enhancement film (BEF) 124 arranged in that order from bottom to top, a first light source 125 and a second light source 126. The light guide plate 122 includes a first light incident surface 1220, a second light incident surface 1221 opposite to the first light incident surface 1220, a light emitting surface 1222 perpendicularly adjoining the first light incident surface 1220 and the second light incident surface 1221, and a bottom surface 1223 opposite to the light emitting surfaces 1222. The first light source 125 is disposed adjacent to the first light incident surface 1220. The second light source 126 is disposed adjacent to the second light incident surface 1221.

Figure 2:
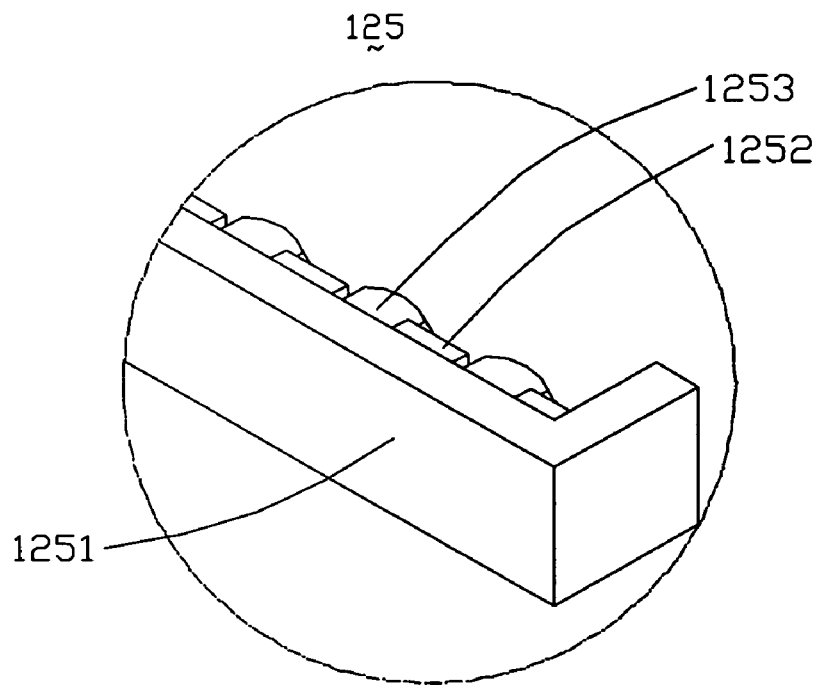
FIG. 2 is an enlarged view of a circle portion II of FIG. 1.

Referring also to FIG. 2, the first light source 125 includes a first supporting plate 1251, a plurality of first light emitting diodes (LEDs) 1252 and a plurality of first reflective elements 1253. The first supporting plate 1251 is substantially U-shaped. The first LEDs 1252 and the first reflective elements 1253 are arranged alternately on the first supporting plate 1251. The first reflective elements 1253 have convex-shaped surfaces facing the first light incident surfaces 1220.

Figure 3:
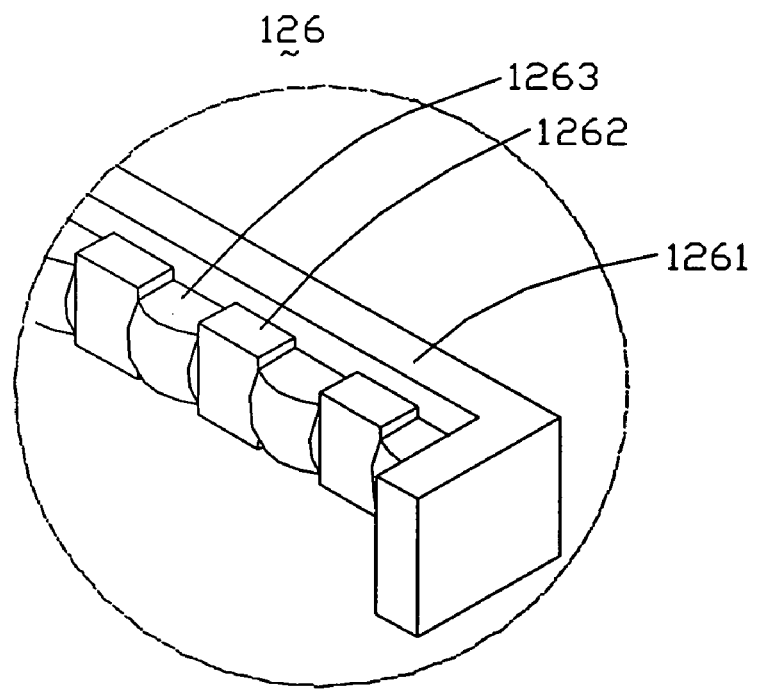
FIG. 3 is an enlarged view of a circle portion III of FIG. 1.

Referring also to FIG. 3, the second light source 126 includes a second supporting plate 1261, a plurality of second LEDs 1262 and a plurality of second reflective elements 1263. The second supporting plate 1261 is substantially U-shaped. The second LEDs 1262 and the second reflective elements 1263 are alternately arranged on the supporting plate 1261. The second reflective elements 1263 have convex-shaped surfaces facing the second light incident surface 1221.

The first reflective elements 1253 and the second reflective elements 1263 are both made of materials with a high reflective ratio. The first reflective elements 1253 and the first supporting plate 1251 can be integrally made as one piece. The second reflective elements 1263 and the second supporting plate 1262 can be integrally made as one piece.

Figure 4:
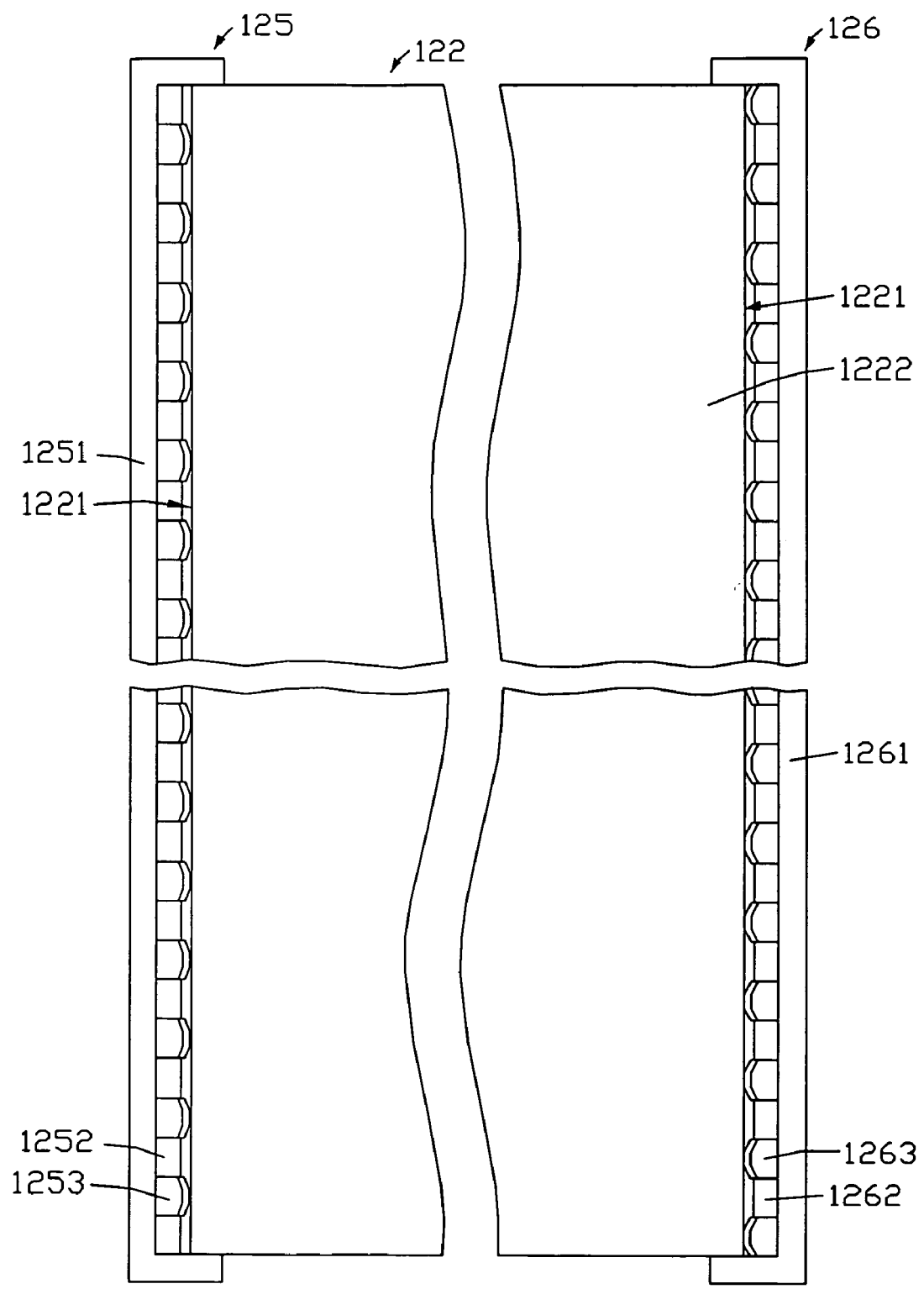
FIG. 4 is an enlarged, assembled view of part of the first light source, the second light source and the light guide plate.
Figure 5:
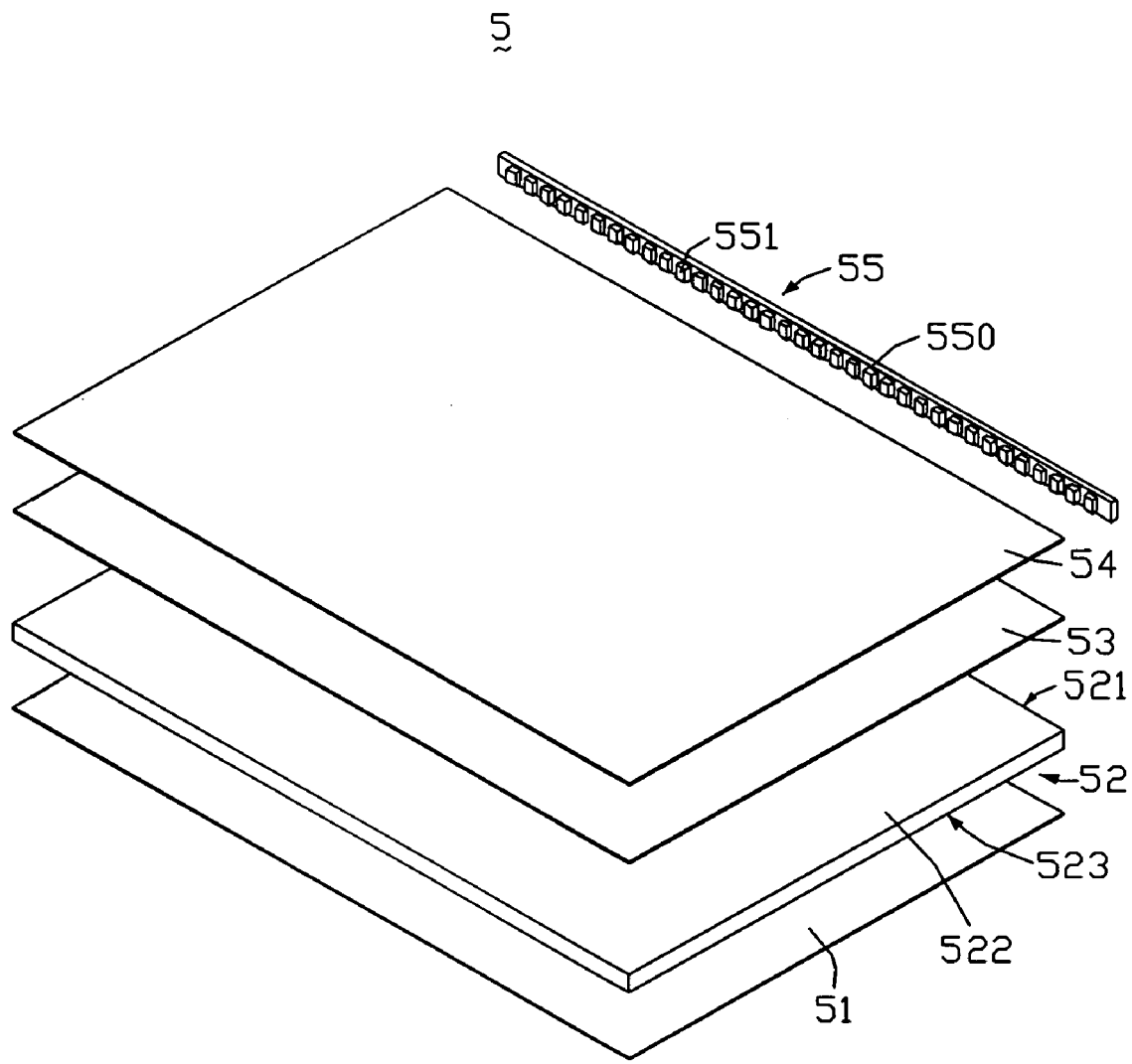
FIG. 5 is an exploded, isometric view of a conventional backlight module.

Referring to FIG. 4, the first light source 125 and the second light source 126 are disposed adjacent to the first light incident surface 1220 and the second light incident surface 1221, respectively. The first reflective elements 1253 of the first light source 125 face the second LEDs 1262 of the second light source 126, respectively. The second reflective elements 1263 of the second light source 126 face the first LEDs 1252 of the first light source 125, respectively.

In operation, light beams emitted from the first LEDs 1252 enter the light guide plate 122 through the first light incident surface 1220, and penetrate in the light guide plate 122. A majority of the light beams emit out from the light emitting surface 1222. A minority of the light beams emit out from the bottom surface 1223. These light beams are reflected by the reflective film 121 and are utilized again. Another minority of light beams emit out from the second light incident surface 1221, and reach the second reflective elements 1263 of the second light source 126. These light beams are reflected by the second reflective elements 1263 with a certain angle of divergence. These light beams enhance the brightness in the areas between every two adjacent second LEDs 1262.

Similarly, light beams emitted by the second LEDs 1262 enter the light guide plate 122 through the second light incident surface 1221, and are converted by the light guide plate 122. A majority of the light beams emit out from the light emitting surface 1222. A minority of the light beams emit out from the bottom surface 1223. These light beams are reflected by the reflective film 121 and are utilized again. Another minority of the light beams emit out from the first light incident surface 1220, and reach the first reflective elements 1253 of the second light source 125. These light beams are reflected by the first reflective elements 1253 with a certain angle of divergence. These light beams enhance the brightness in the areas between every adjacent two first LEDs 1252.

The light beams reflected by the first reflective elements 1253 and the second reflective elements 1263 thus penetrate in the light guide plate 122, and emit out from the light emitting surface 1222. Then the light beams transmit through the diffusion film 123 and the BEF 124 and become uniform.

Unlike conventional liquid crystal displays, the liquid crystal display 1 includes a first light source 125 and a second light source 126 provided adjacent to the two opposite first light incident surface 1220 and second light incident surface 1221 of the light guide plate 122. The first light source 125 includes the first reflective elements 1253 sandwiched between the first LEDs 1252. The second light source 126 includes the second reflective elements 1263 sandwiched between the second LEDs 1262. The first LEDs 1252 face the second reflective elements 1263, and the second LEDs 1262 face the first reflective elements 1253. Light beams reflected by first reflective elements 1253 and the second reflective elements 1263 enhance the brightness and the uniformity in areas between every two first LEDs 1252 or every two second LEDs 1262. Thus, despite of a certain limited angle of divergence of light beams emitted by the first LEDs 1252 and the second LEDs 1262, the light beams emitted from the light guide plate 122 are uniform. Therefore, a brightness and a uniformity of the backlight module 12 are improved, and a display quality of the liquid crystal display 1 is improved.

Further or alternative embodiments may include the following. In a first example, the first reflective elements and the second reflective elements can have wave-shaped surfaces facing a light guide plate. In a second example, the first reflective elements and the second reflective elements can have V-shaped surfaces facing a light guide plate. In still a third example, a first supporting plate and a second supporting plate each includes a plurality of protrusions extending toward a light guide plate. In such case, a plurality of reflective films are attached to the protrusions to function as reflective elements.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight module comprising:
   a light guide plate comprising a first light incident surface and a second light incident surface opposite to the first light incident surface;
   a first light source provided adjacent to the first light incident surface, the first light source comprising a plurality of first light emitting diodes and a plurality of first reflective members, the first light emitting diodes and the first reflective members arranged as a row along a direction parallel to the first light incident surface; and
   a second light source provided adjacent to the second light incident surface, the second light source comprising a plurality of second light emitting diodes each arranged in alignment with a corresponding one of the first reflective members and a plurality of second reflective members each arranged in alignment with a corresponding one of the first light emitting diodes, the second light emitting diodes and the second reflective members arranged as a row along a direction parallel to the second light incident surface;
   wherein each of the first and second reflective members comprises a surface facing towards the light guide plate, each of the first and second light emitting diodes comprises a light emitting surface facing towards the light guide plate, the surfaces of the first reflective members face towards the light emitting surfaces of the second light emitting diodes, and the surfaces of the second reflective members face towards the light emitting surfaces of the first light emitting diodes.

2. The backlight module as claimed in claim 1, wherein the surface of each of the first and second reflective members has one shape selected from the group consisting of a convex shape, a wave shape and a V-shape.

3. The backlight module as claimed in claim 1, wherein the first light source further comprises a first supporting plate, and the first light emitting diodes and the first reflective members are provided alternately on an inner surface of the first supporting plate.

4. The backlight module as claimed in claim 3, wherein every two adjacent first light emitting diodes are spaced by one corresponding first reflective member.

5. The backlight module as claimed in claim 3, wherein the first reflective members and the first supporting plate are made integrally as one piece.

6. The backlight module as claimed in claim 3, wherein the second light source further comprises a second supporting plate, and the second light emitting diodes and the second reflective members are provided alternately on an inner surface of the second supporting plate.

7. The backlight module as claimed in claim 6, wherein every two adjacent second light emitting diodes are spaced by one corresponding second reflective member.

8. The backlight module as claimed in claim 6, wherein the second reflective members and the second supporting plate are made integrally as one piece.

9. The backlight module as claimed in claim 1, wherein the first and second light emitting diodes are configured to emit light beams towards the first and second light incident surfaces of the light guide plate, and the first and second reflective members are configured to reflect a part of the light beams which emit out again from the first and second light incident surfaces after entering the light guide plate.

10. The backlight module as claimed in claim 2, wherein the surfaces of the first reflective members are closer to the first light incident surface than the first light emitting diodes, and the surfaces of the second reflective members are closer to the second light incident surface than the second light emitting diodes.

11. A backlight module, comprising:
a light guide plate comprising a first light incident surface and a second light incident surface opposite to the first light incident surface;
a first light source provided adjacent to the first light incident surface, the first light source comprising a first supporting plate, a plurality of first light emitting diodes and a plurality of first reflective members, the first light emitting diodes and the first reflective members provided alternately on the first supporting plate;
a second light source provided adjacent to the second light incident surface, the second light source comprising a second supporting plate, a plurality of second light emitting diodes each arranged in alignment with a corresponding one of the first reflective members and a plurality of second reflective members each arranged in alignment with a corresponding one of the first light emitting diodes, the second light emitting diodes and the second reflective members provided alternately on the second supporting plate;
wherein the first supporting plate and the second supporting plate each comprise a plurality of protrusions extending towards the light guide plate, each of the protrusions being sandwiched between two corresponding adjacent light emitting diodes, the first reflective members and the second reflective members being a plurality of reflective films attached to the protrusions; and
wherein each of the protrusions comprises a surface facing towards the light guide plate, each of the first and second light emitting diodes comprises a light emitting surface facing towards the light guide plate, the surfaces of the protrusions on the first supporting plate face towards the light emitting surfaces of the second light emitting diodes, and the surfaces of the protrusions on the second supporting plate face towards the light emitting surfaces of the first light emitting diodes.

12. The backlight module as claimed in claim 11, wherein the surface of each of the protrusions on the first supporting plate and the second supporting plate has one shape selected from the group consisting of a convex shape, a wave shape and a V-shape.

13. A backlight module, comprising:
a light guide plate comprising a first light incident surface and a second light incident surface opposite to the first light incident surface; and
a light source arrangement comprising a first light source provided adjacent to the first light incident surface, and a second light source provided adjacent to the second light incident surface, each of the first light source and the second light source comprising a plurality of light emitting diodes and a plurality of reflective members arranged as a row along a direction parallel to the two light incident surfaces;
wherein each light emitting diode of the second light source is arranged in alignment with a corresponding one of the reflective members of the first light source, each reflective member of the second light source is arranged in alignment with a corresponding one of the light emitting diodes of the first light source, any one of the light emitting diodes of the light source arrangement is arranged at one end of an imaginary straight line running perpendicular to the first and second light incident surfaces, and the corresponding reflective member of the light source arrangement is arranged at the other end of the imaginary straight line.

14. The backlight module as claimed in claim 13, wherein each of the first reflective members and the second reflective members comprises a surface facing the light guide plate, and the surface of each of the first and second reflective members has one shape selected from the group consisting of a convex shape, a wave shape and a V-shape.

15. The backlight module as claimed in claim 13, wherein in each of the first light source and the second light source, every two adjacent light emitting diodes are spaced by one corresponding reflective member.

16. The backlight module as claimed in claim 15, wherein the first light source further comprises a first supporting plate, the second light source further comprises a second supporting plate, the light emitting diodes and reflective members of the first light source are provided alternately on an inner surface of the first supporting plate, and the light emitting diodes and reflective members of the second light source are provided alternately on an inner surface of the second supporting plate.

17. The backlight module as claimed in claim 16, wherein the reflective members of the first light source and the first supporting plate are made integrally as one piece, and the reflective members of the second light source and the second supporting plate are made integrally as one piece.

* * * * *